US011828168B2

(12) United States Patent
AlTammar et al.

(10) Patent No.: US 11,828,168 B2
(45) Date of Patent: Nov. 28, 2023

(54) METHOD AND SYSTEM FOR CORRECTING AND PREDICTING SONIC WELL LOGS USING PHYSICS-CONSTRAINED MACHINE LEARNING

(71) Applicant: SAUDI ARABIAN OIL COMPANY, Dhahran (SA)

(72) Inventors: Murtadha J. AlTammar, Dhahran (SA); Weichang Li, Katy, TX (US); Khalid M. Alruwaili, Dhahran (SA); Osman Hamid, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 195 days.

(21) Appl. No.: 17/363,326

(22) Filed: Jun. 30, 2021

(65) Prior Publication Data
US 2023/0003118 A1    Jan. 5, 2023

(51) Int. Cl.
*E21B 47/04* (2012.01)
(52) U.S. Cl.
CPC .......... *E21B 47/04* (2013.01); *G01V 2210/61* (2013.01)
(58) Field of Classification Search
None
See application file for complete search history.

(56) References Cited
U.S. PATENT DOCUMENTS

| 6,654,692 B1 | 11/2003 | Neff |
| 2015/0356403 A1 | 12/2015 | Storm, Jr. |
| 2016/0170065 A1 | 6/2016 | Jain et al. |
| 2019/0169986 A1* | 6/2019 | Storm, Jr. ............. G01V 11/00 |
| 2019/0293818 A1 | 9/2019 | Meek |

(Continued)

FOREIGN PATENT DOCUMENTS

| CN | 111025396 A | 4/2020 |
| CN | 111665560 A | 9/2020 |

(Continued)

OTHER PUBLICATIONS

Zhang, Donogxiao, et al., "Synthetic well logs generation via Recurrent Neural Networks", Petroleum Exploration and Development, vol. 45, Issue 4, pp. 629-639, Apr. 2018 (11 pages).

(Continued)

*Primary Examiner* — Lina Cordero
(74) *Attorney, Agent, or Firm* — Osha Bergman Watanabe & Burton LLP

(57) ABSTRACT

A computer-implemented method may include obtaining well logs data pertaining to a well of interest. The method may further include training a physics-constrained machine learning (PCML) model using the obtained well logs data as inputs. The method may further include outputting one or more sonic logs and mechanical properties of interest determined by using the trained PCML model and the obtained well logs data for the well of interest. The method may further include updating the determined sonic logs and mechanical properties of interest based on a breakout model and field breakout data for the well of interest. The method may further include outputting the final sonic logs for the well of interest. The method may further include determining one or more mechanical properties for well planning based on the final sonic logs for the well of interest.

20 Claims, 7 Drawing Sheets

(56) References Cited

U.S. PATENT DOCUMENTS

| | | |
|---|---|---|
| 2019/0368316 A1 | 12/2019 | Bize-Forest et al. |
| 2020/0088897 A1 | 3/2020 | Roy et al. |
| 2021/0041596 A1 | 2/2021 | Kushwaha et al. |
| 2021/0326721 A1* | 10/2021 | Zhang .................. G01V 99/005 |

FOREIGN PATENT DOCUMENTS

| | | |
|---|---|---|
| WO | 20160187242 A1 | 11/2016 |
| WO | 2019236955 A1 | 12/2019 |
| WO | 2020131082 A1 | 6/2020 |
| WO | 2020185094 A1 | 9/2020 |
| WO | 2020185840 A1 | 9/2020 |
| WO | 2020197769 A1 | 10/2020 |

OTHER PUBLICATIONS

Raissi, M., et al., "Physics-informed neural networks: A deep learning framework for solving forward and inverse problems involving nonlinear partial differential equations", Journal of Computational Physics, pp. 686-707, 2019 (22 pages).

Zhu, Yinhao, et al., "Physics-constrained deep learning for high-dimensional surrogate modeling and uncertainty qualification without labeled data", Journal of Computerized Physics, pp. 56-81, 2019 (26 pages).

Chen, Yuntian, et al., "Physics-Constrained Deep Learning of Geomechanical Logs", IEEE Transactions on Geoscience and Remote Sensing, vol. 58, No. 8, pp. 5932-5943, Aug. 2020 (12 pages).

Pham, Nam, et al., "Missing well log prediction using convolutional long short-term memory network", Geophysics, vol. 85, No. 4, pp. WA159-WA171, Aug. 2020 (13 pages).

Onalo, David, et al., "Dynamic data driven sonic well log model for formation evaluation", Journal of Petroleum Science and Engineering, pp. 1049-1062, 2019 (14 pages).

Barton, Colleen A., et al., "In-Situ Stress Orientation and Magnitude at the Fenton Geothermal Site, New Mexico, Determined From Wellbore Breakouts", Geophysical Research Letters, vol. 15, No. 5, pp. 467-470, May 1988 (5 pages).

Bader et al.; "Missing log data interpolation and semiautomatic seismic well ties using data matching techniques", Interpretation; vol. 7; Issue 2; May 2019; pp. T347-T361 (15 pages).

Chen, Y. and Zhang, D.; "Physics-Constrained Deep Learning of Geomechanical Logs", IEEE Transactions on Geoscience and Remote Sensing; vol. 58; No. 8; pp. 5932-5943 (12 pages).

Justin Gosses; "Stratigraphic top prediction in well logs via machine learning: Predictatops;" Aug. 11, 2019; pp. 1-14; Retrieved from the Internet: URL: https://justingosses.medium.com/https-medium-com-justingosses-stratigraphic-pick-prediction-via-supervised-machine-learning-predictatops-841cb5fc3efb (14 pages).

Dave Hale, "Image-guided 3D interpolation of borehola data", SEG Technical Program Expanded Abstracts 2010; Oct. 21, 2010; pp. 1-13 (13 pages).

Hengl et al.; "Random Forest as a generic framework for predictive modeling of spatial and spatio-temporal variables", PeerJ Preprints; vol. 3; May 27, 2018; pp. 1-47 (47 pages).

Kim et al.; "Generation of Synthetic Density Log Data Using Deep Learning Algorithm at the Golden Field in Alberta, Canada", Geofluids; vol. 2020; Jan. 30, 2020; pp. 1-26 (26 pages).

Shi et al.; "Well log interpolation guided by geologic distance;" SEG Technical Program Expanded Abstracts 2017; Aug. 2017; pp. 1939-1943 (5 pages).

Yingwei Yu, "Interpolating High-Resolution Well Log Volume Using Seismic Dip Vectors and Control Grids", Unconventional Resources Technology Conference; URTEC-2016-2435701-MS; Aug. 1, 2016; pp. 1-11 (11 pages).

* cited by examiner

METHOD AND SYSTEM FOR CORRECTING AND PREDICTING SONIC WELL LOGS USING PHYSICS-CONSTRAINED MACHINE LEARNING

BACKGROUND

Well logs can be used to calculate mechanical properties based on rock physics equations to understand distribution and nature of rocks and fluids in the subsurface. A well log is a detailed and sequential collection of one category of data (e.g., gamma ray, sonic, porosity, resistivity, density, etc.) for a geological formation by using a logging tool along the path of a well borehole in the ground. A well log may be collected by visual inspection of rock samples brought to the surface or on physical measurements made by a logging tool lowered into the borehole. However, well logs may be missing or poor in quality because of a failed or malfunctioning logging tool. Sometimes, operators may turn off recording equipment at the wrong time. The missing or poor well logs provide less information and uncertainties that may affect the next well to drill.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining well logs data pertaining to a well of interest. The method further includes training a physics-constrained machine learning (PCML) model using the obtained well logs data as inputs. The method further includes outputting one or more sonic logs and mechanical properties of interest determined by using the trained PCML model and the obtained well logs data for the well of interest. The method further includes updating the determined sonic logs and mechanical properties of interest based on a breakout model and field breakout data for the well of interest. The method further includes outputting the final sonic logs for the well of interest. The method further includes determining one or more mechanical properties for well planning based on the final sonic logs for the well of interest.

In general, in one aspect, embodiments relate to a system that includes a logging system coupled to a logging tool. The system further includes a well system coupled to the logging system and a wellbore. The system further includes an artificial intelligence module including a computer processor. The artificial intelligence module is coupled to the logging system and the well system. The artificial intelligence module obtains well logs data pertaining to a well of interest. The artificial intelligence module trains a PCML model using the obtained well logs data as inputs. The artificial intelligence module outputs one or more sonic logs and mechanical properties of interest determined by using the trained PCML model and the obtained well logs data for the well of interest. The artificial intelligence module updates the determined sonic logs and mechanical properties of interest based on a breakout model and field breakout data for the well of interest. The artificial intelligence module outputs the final sonic logs for the well of interest. The artificial intelligence module determines one or more mechanical properties for well planning based on the final sonic logs for the well of interest.

In general, in one aspect, embodiments relate to a non-transitory computer readable medium storing instructions executable by a computer processor. The instructions include obtaining well logs data pertaining to a well of interest. The instructions further include training a PCML model using the obtained well logs data as inputs. The instructions further include outputting one or more sonic logs and mechanical properties of interest determined by using the trained PCML model and the obtained well logs data for the well of interest. The instructions further include updating the determined sonic logs and mechanical properties of interest based on a breakout model and field breakout data for the well of interest. The instructions further include outputting the final sonic logs for the well of interest. The instructions further include determining one or more mechanical properties for well planning based on the final sonic logs for the well of interest.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
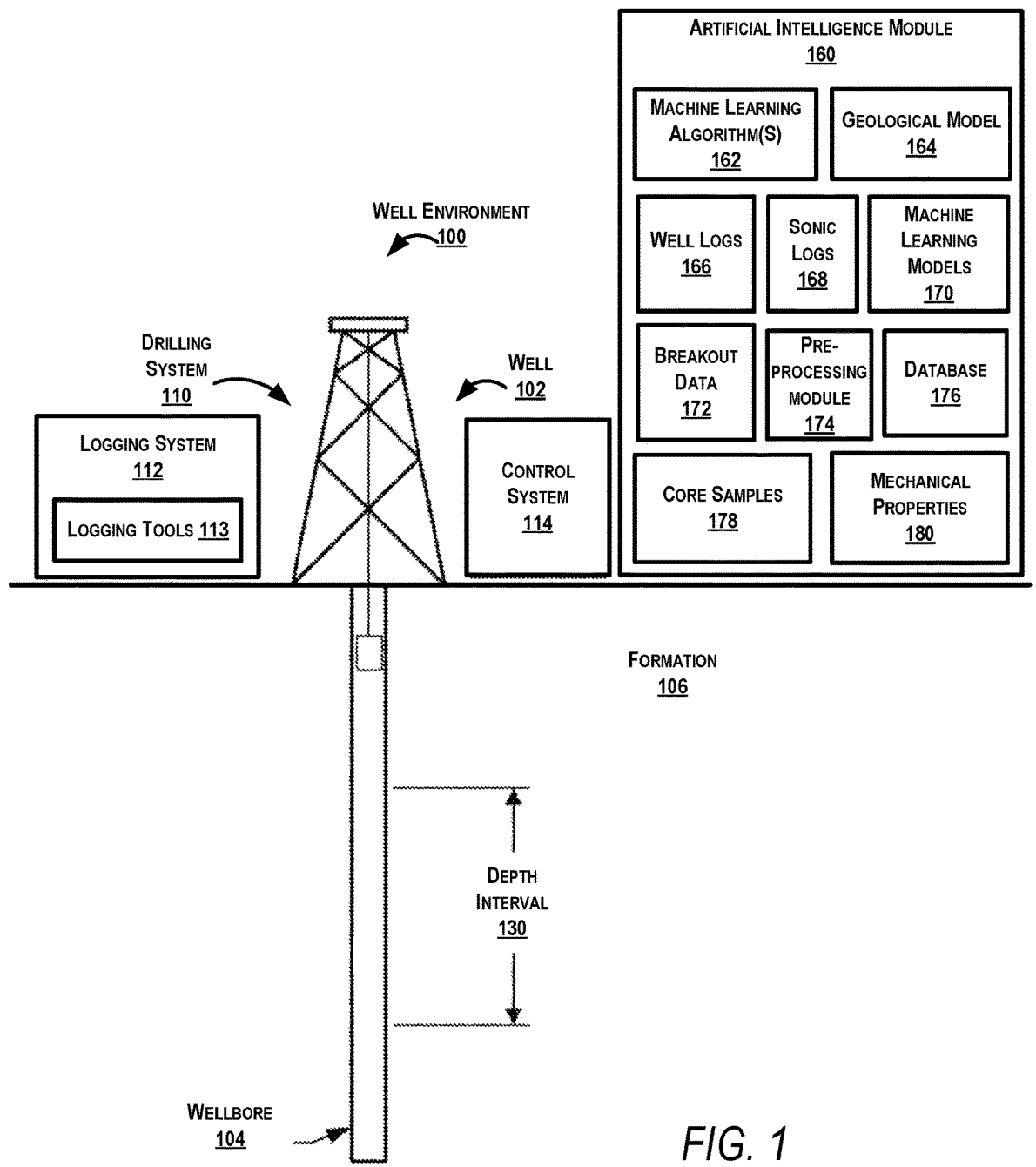
FIG. 1 shows a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure relate to a system and a method for a physics-constrained machine learning (PCML) workflow to correct and predict sonic logs and mechanical properties of interest. The PCML workflow may be performed in two sections. In the first section, the PCML workflow may use well logs (e.g., gamma ray (GR), density (ZDEN), neutron porosity (NPHI), depth (measured depth (MD) or true vertical depth (TVD)) as input parameters to predict and correct sonic logs (e.g., compressional sonic travel time (DTC) and shear sonic travel time (DTS)). The PCML workflow uses the predicted sonic logs to determine valid rock mechanical properties (e.g., Young's modulus (E) and Poisson's ratio (v)) based on rock physics equations. However, the predicted sonic logs and mechanical properties of interest may have non-physical values. For example, the predicted mechanical properties (e.g., Young's modulus, Poisson's ratio) have negative values that are not consistent with field measurements. As such, some embodiments address these problems by applying an objective function within a PCML algorithm which includes both a sonic log prediction error (e.g., mean square error (MSE) or root mean squared error (RMSE)) and a physics constraint directed loss. For example, the physics constraint directed loss is defined in terms of the validity of the mechanical properties of interest.

In some example embodiments, in the second section, the PCML workflow corrects the predicted sonic logs and mechanical properties of interest based on a breakout model. Breakouts are caused by the local shear failure around a borehole due to horizontal compression when the compressive stress at the borehole wall exceeds the rock strength (e.g., unconfined compressive strength (UCS)). The stress-induced wellbore breakouts are important indicators of the direction of horizontal principal stresses. A breakout model characterizes the correlation of breakout data (e.g., breakout angle, width, azimuth, and depth) with independent stress measurements and other mechanical properties. For example, breakout data characterize the variation in circumferential stress as a function of the breakout angle with respect to the maximum horizontal compressive stress (SHmax) with knowledge of mechanical properties (e.g., the least horizontal compressive stress (Shmin), the maximum horizontal compressive stress (SHmax), UCS, pore pressure (Pp), transgressive surface (TS), cohesion, formation pore pressure, borehole fluid pressure, friction angle (FANG), etc.). Particularly, the breakout width which is twice the angle of breakout initiation with respect to the least horizontal compressive stress (Shmin) may be characterized by mechanical properties (e.g., UCS, Shmin, SHmax, formation pore pressure, borehole fluid pressure, etc.). The breakout azimuth which coincides with the direction of Shmin may be affected by the changes in mechanical properties (e.g., Young's modulus and Poisson's ratio). The breakout depth is associated with mechanical properties (e.g., transgressive surface).

Furthermore, the PCML workflow calculates breakout data (e.g., breakout angle, width, azimuth, and depth) based on the predicted sonic logs and mechanical properties from the first section and other parameters obtained from the field (e.g., Shmin, SHmax, UCS, pore pressure (Pp), cohesion, formation pore pressure, borehole fluid pressure, etc.). The calculated breakout data is compared with field data (e.g., breakout angle, width, azimuth, and depth) to generate final predicted sonic logs and mechanical properties of interest which are essential to build accurate mechanical earth models frequently used to optimize mud weight during drilling. The final predicted sonic logs and mechanical properties of interest may complete missing segment and/or clean up poor quality sonic logs due to bad borehole conditions.

Turning to FIG. 1, a schematic diagram in accordance with one or more embodiments is shown. FIG. 1 illustrates a well environment (100) that may include a well (102) having a wellbore (104) extending into a formation (106). The wellbore (104) may include a bored hole that extends from the surface into a target zone of the formation (106), such as a reservoir. The formation (106) may include various formation characteristics of interest, such as gamma ray, neutron porosity, depth (measured depth or true vertical depth), caliper (CAL), spontaneous potential (SP), sonic, neuron (CNC), resistivity (e.g., shallow resistivity (LLS and ILD), medium resistivity (HRM), deep resistivity (HRD)), photo-electric absorption factor (PE), density (ZDEN), transgressive surface, cohesion, formation pore pressure, borehole fluid pressure, SHmax, Shmin, friction angle, Young's modulus, Poisson's ratio, formation UCS, formation porosity, formation permeability, rock type, unconstrained sonic velocity, stiffness, water saturation and the like. Gamma ray may indicate the rock and/or sediment for a formation (106) within the area of interest. Neutron porosity may indicate correct porosity assuming that the pores are filled with fresh water for a formation (106) within the area of interest. True vertical depth may indicate the vertical depth from the surface down to a formation (106) within the area of interest. Measured depth may indicate the total length of the wellbore measured along the actual well path to a formation (106) within the area of interest. Caliper may indicate cave ins or shale swelling within a formation (106) within the area of interest. Spontaneous potential may indicate small electric potentials between depths within the borehole for a formation (106) within the area of interest and a grounded electrode at the surface.

Furthermore, sonic may indicate a formation's transit time which is a measure of how fast elastic seismic compressional and shear waves travel through a formation (106) within the area of interest. Sonic logs provide a formation interval transit time, which is typically a function of lithology and rock texture but particularly porosity. Neuron indicates the amount of moisture or volatile matter for a formation (106) within the area of interest. Resistivity indicates how strongly rock and/or fluid within the formation (106) opposes the flow of electrical current which provide information about the porosity of a formation, water saturation, and the presence of hydrocarbons matter for a formation (106) within the area of interest. Photo-electric absorption factor indicates the rock matrix properties for a formation (106) within the area of interest. Density indicates the bulk density along the length of a borehole for a formation (106) within the area of interest. Transgressive surface is a marine flooding surface that forms the first significant flooding surface in a sequence, and marks the onset of the period when the rate of creation of accommodation space is greater than the rate of sediment supply. Cohesion indicates the inherent shear strength for a formation (106) within the area of interest. Formation pore pressure indicates the pressure of the fluid in the pore space of a rock for a formation (106) within the area of interest. Borehole fluid pressure indicates the pressure of the fluid in the borehole. SHmax indicates an independent normal stress with the maximum magnitude on the horizontal plane with no shear stress in which it is applied for a formation (106) within the area of interest. Shmin indicates an independent normal stress with the minimum magnitude on the horizontal plane with no shear stress in which it is applied for a formation (106) within the area of interest. Friction angle indicates the formation porosity and volume of a formation (106) within the area of interest.

Furthermore, Young's modulus indicates the tensile stiffness of a solid material in the relationship between tensile stress (force per unit) and axial strain (proportional deformation) for a formation (106) within the area of interest.

Poisson's ratio indicates the deformation (expansion or contraction) of a rock material in directions perpendicular to the specific direction of loading. For example, Poisson's ratio may have an appropriate value between "0.04" and "0.3" for a formation (106) within the area of interest. UCS indicates the maximum axial compressive stress that a particular rock sample for a formation (106) within the area of interest can bear under zero confining stress. Porosity indicates how much space exists in a particular rock in the formation (106) within an area of interest, where oil, gas, and/or water may be trapped. Unconstrained sonic velocity indicates the compressional velocity (Vp) and shear velocity (Vs) for a formation (106) within the area of interest. Stiffness indicates the elasticity for a formation (106) within the area of interest. Permeability indicates the ability of liquids and gases to flow through the rock within the area of interest. Water saturation indicates the fraction of water in a given pore space.

Continuing with FIG. 1, the well environment (100) includes a drilling system (110), a logging system (112), a control system (114), and an artificial intelligence (AI) module (160). The drilling system (110) includes at least a drill string, a drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a PLC may control valve states, fluid levels, pipe pressures, warning alarms, drilling parameters (e.g., torque, WOB, SPP, RPM, etc.) and/or pressure releases throughout a drilling rig. In particular, a PLC may be a ruggedized computer system with functionality to withstand vibrations, extreme temperatures, wet conditions, and/or dusty conditions, for example, around a drilling rig.

Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

The logging system (112) may include one or more logging tools (113) (e.g., an impulse hammer geomechanical probe, a nuclear magnetic resonance (NMR) spectrometer, a resistivity logging tool, an acoustic transducer, an acoustic borehole televiewer, etc.) for use in generating well logs (166), sonic logs (168), breakout data (172), core samples (178) and mechanical properties (180) of the formation (106). The logging tools (113) provide a powerful way to characterize the fine scale petrophysical properties (e.g., gamma ray, neutron porosity, depth, caliper, spontaneous potential, compressional sonic travel times, shear sonic travel times, neuron, shallow resistivity, medium resistivity, deep resistivity, photo-electric absorption factor, UCS, unconstrained sonic velocities, density, porosity, Young's modulus, stiffness, Poisson's ratio, etc.). For example, the impulse hammer logs measure the reduced Young's modulus by measuring the force-time response at the tip of a small instrumented sensor dropped on a core surface from a specified height and sampling interval. The measurement of reduced Young's modulus may be used to determine other elastic properties for a plurality of core samples (e.g., whole core, slabbed core, viewing slabs, and the ends of small plug samples). More specifically, the impulse hammer logs measure mechanical variations in two dimensions, and measure both elastic stiffness and hardness.

Furthermore, as another example, an NMR logging tool may measure the induced magnetic moment of hydrogen nuclei (e.g., protons) contained within the fluid-filled pore space of porous media (e.g., reservoir rocks). Thus, NMR logs may measure the magnetic response of fluids present in the pore spaces of the reservoir rocks. In so doing, NMR logs may measure both porosity and permeability, as well as the types of fluids present in the pore spaces. Thus, NMR logging may be a subcategory of electromagnetic logging that responds to the presence of hydrogen protons rather than a rock matrix. Because hydrogen protons may occur primarily in pore fluids, NMR logging may directly or indirectly measure the volume, composition, viscosity, and distribution of pore fluids. As another example, an acoustic transducer may measure an acoustic impulse signal periodically generated by a transmitter and picked up by a receiver mounted on a support for movement through the length of the well bore. The transmitter and receiver are spaced apart by a fixed distance and as the support is moved through the well bore. The amplitudes of the received signals are correlated with the depth in the well bore to provide a log indicating the qualities (e.g., acoustic velocity Vp and Vs) of the cement bonding to the bore over the length of the well. As another example, an acoustic borehole televiewer is an ultrasonic well-logging tool to detect stress-induced wellbore breakouts and measure angle, width, azimuth, and depth of stress-induced breakouts in the well. The televiewer is used to image a breakout in depth by scanning the borehole wall using a rotating acoustic transducer that emits a focused beam pulse at a very high rate when it rotates and moves vertically up the borehole.

For example, a logging tool (113) may be lowered into the wellbore (104) and/or in the laboratory to acquire measurements (e.g., well logs (166), sonic logs (168), breakout data (172)), core samples (178) and mechanical properties (180) as the tool traverses a depth interval (130) (e.g., a targeted reservoir section) of the wellbore (104). The plot of the logging measurements versus depth may be referred to as a "log" or "well log". Well logs (166) may provide depth measurements of the well (102) that describe such reservoir characteristics as formation porosity, formation permeability, resistivity, density, water saturation, total organic content (TOC), volume of kerogen, Young's modulus, Poisson's ratio, and the like. The resulting logging measurements may be stored and/or processed, for example, by the control system (114), to generate corresponding well logs (166) for the well (102). A well log may include, for example, a plot of a logging response time versus true vertical depth (TVD) across the depth interval (130) of the wellbore (104).

Reservoir characteristics may be determined using a variety of different techniques. For example, certain reservoir characteristics can be determined via coring (e.g., physical extraction of rock samples) to produce core samples and/or logging operations (e.g., wireline logging, logging-while-drilling (LWD) and measurement-while-drilling (MWD)). Coring operations may include physically extracting a rock sample from a region of interest within the wellbore (104) for detailed laboratory analysis. For example, when drilling an oil or gas well, a coring bit may cut plugs (or "cores" or "core samples") from the formation (106) and bring the plugs to the surface, and these core samples may be analyzed at the surface (e.g., in a lab) to determine various characteristics of the formation (106) at the location where the sample was obtained.

To determine porosity in the formation (106), various types of logging techniques may be used. For example, the logging system (112) may measure the speed that acoustic waves travel through rocks in the formation (106). This type of logging may generate borehole compensated (BHC) logs, which are also called sonic logs. In general, sound waves may travel faster through high-density shales than through lower-density sandstones. Likewise, density logging may also determine density measurements or porosity measurements by directly measuring the density of the rocks in the formation (106). Furthermore, neutron logging may determine porosity measurements by assuming that the reservoir pore spaces within the formation (106) are filled with either water or oil and then measuring the amount of hydrogen atoms (i.e., neutrons) in the pores. In some embodiments, gamma ray logging is used to measure naturally occurring gamma radiation to characterize rock or sediment regions within a wellbore. In particular, different types of rock may emit different amounts and different spectra of natural gamma radiation. For example, gamma ray logs may distinguish between shales and sandstones/carbonate rocks because radioactive potassium may be common to shales. Likewise, the cation exchange capacity of clay within shales also results in higher absorption of uranium and thorium further increasing the amount of gamma radiation produced by shales.

Keeping with the various types of logging techniques, resistivity logging may measure the electrical resistivity of rock or sediment in and around the wellbore (104). In particular, resistivity measurements may determine a type of fluid present in the formation (106) by measuring how effective these rocks are at conducting electricity. Because fresh water and oil are poor conductors of electricity, they have a high resistivity measurement. As such, resistivity measurements obtained via such logging can be used to determine corresponding reservoir water saturation (Sw).

Furthermore, while electromagnetic waves propagate without losing energy in a vacuum, electromagnetic waves in porous reservoir rocks are attenuated and phase shifted during transmission through the rock medium. Porosity measurements from various logs (e.g., density log, neutron log, sonic log, or an NMR log) may estimate the total porosity in reservoir rocks. In contrast, a multi-frequency dielectric logging tool may determine a value of the water-filled porosity in the reservoir rock.

Furthermore, geosteering may be used to position the drill bit or drill string of the drilling system (110) relative to a boundary between different subsurface layers (e.g., overlying, underlying, and lateral layers of a pay zone) during drilling operations. In particular, measuring rock properties during drilling may provide the drilling system (110) with the ability to steer the drill bit in the direction of desired hydrocarbon concentrations. As such, a geosteering system may use various sensors located inside or adjacent to the drilling string to determine different rock formations within a well path. In some geosteering systems, drilling tools may use resistivity or acoustic measurements to guide the drill bit during horizontal or lateral drilling.

Continuing with FIG. 1, the AI module (160) includes hardware and/or software with functionality to pre-process well logs (166), sonic logs (168) and the breakout data (172). For example, the pre-processing module (174) assesses well logs (166) and sonic logs (168) for missing or poor data due to bad borehole conditions. Particularly, the pre-processing module (174) calculates one or more mechanical properties (180) (e.g., Young's modulus, Poisson's ratio) using compressional and shear sonic travel times as input parameters based on a breakout model. The pre-processing module (174) calculates a breakout angle, width, azimuth, and depth using the predicted and real mechanical properties based on a breakout model.

Those skilled in the art will appreciate that the AI module may run on any suitable computing device which has processors and memory for storing AI data. Thus, the AI module (160) includes hardware and/or software (e.g., a processor, memory) with functionality to apply one or more machine learning (ML) algorithms (162) (e.g., a supervised ML algorithm, a Deep Learning (DL) algorithm) for generating one or more ML models (170) for use in assessing the well logs (166) to correct and predict sonic logs (168) in the formation (106) that has missing or poor sonic data due to bad borehole conditions for an existing well or a new well. For example, the AI module (160) may assess the well logs (e.g., gamma ray, density, neutron porosity, depth, etc.) and partition the well logs into a training data set, a validation data set and a testing data set stored in a database (176).

In one or more embodiments, the AI module (160) is configured to train a ML model (170) using a ML algorithm (e.g., a supervised ML algorithm, a DL algorithm) based on the training data set to predict one or more mechanical properties (180) (e.g., Young's modulus, Poisson's ratio) based on the predicted sonic logs (168) and rock physics equations. Thus, different types of ML models (e.g., convolutional neural networks, deep neural networks, recurrent neural networks, support vector machines, multilayer perceptron layers, decision trees, inductive learning models, deductive learning models, supervised learning models, etc.) may be trained for various formations of interest. In some embodiments, the AI module (160) may generate augmented or synthetic data to produce a large amount of interpreted data for training a particular model. Further details on the ML algorithm are provided below in FIG. 2 and the accompanying description.

Keeping with FIG. 1, a well path of a wellbore (104) may be updated by the control system (114) using a geological model (e.g., one of the geological models (164)). For example, a control system (114) may communicate geosteering commands to the drilling system (110) based on well data updates that are further adjusted by the AI module (160) using a geological model (164). As such, the control system (114) may generate one or more control signals for drilling equipment based on an updated well path design and/or a geological model. In some embodiments, the AI module (160) determines one or more formation top depths from seismic data and/or well log data. The AI module (160) may use these formation top depths to adjust the well path of the wellbore (104) accordingly.

Figure 2:
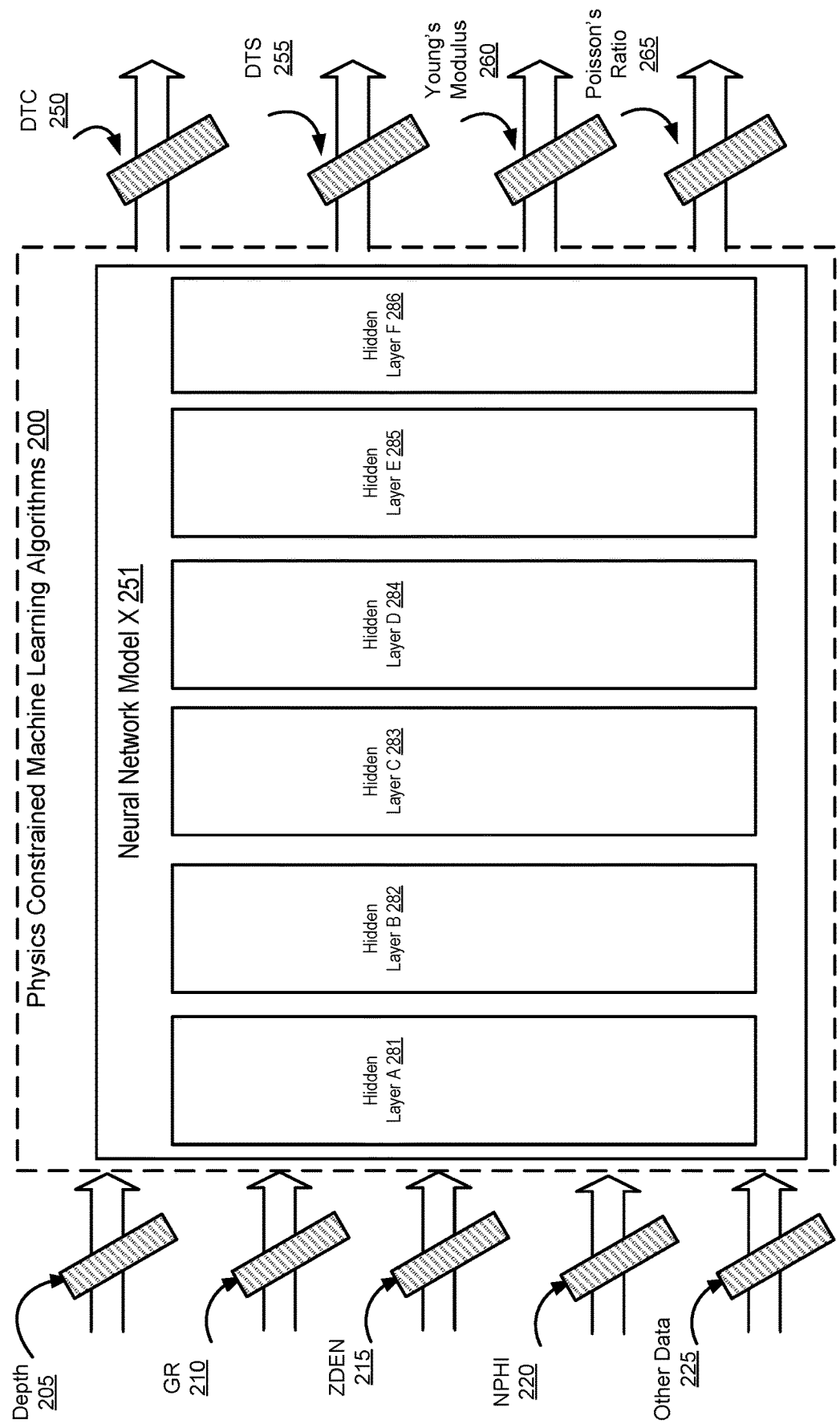
FIG. 2 shows an example in accordance with one or more embodiments.

FIG. 2 shows an example of generating a model to determine one or more sonic logs and mechanical properties of interest based on multiple well logs in accordance with one or more embodiments. The following example is for explanatory purposes only and not intended to limit the scope of the disclosed technology.

In FIG. 2, a neural network model X (251) is trained using one or more PCML algorithms (200) for predicting sonic logs (e.g., DTC (250) and DTS (255)) and mechanical properties (e.g., Young's modulus (260) and Poisson's ratio (265)). The neural network model X (251) obtains multiple input well logs (e.g., depth (205), GR (210), ZDEN (215), NPHI (220), and other data (225)) to determine the predicted outputs represented by the output layer consisting of predicted sonic logs DTC (250) and DTS (255) and mechanical properties (e.g., Young's modulus (260) and Poisson's ratio (265)). However, other embodiments are contemplated that use other input variables, such as resistivity, porosity, spontaneous potential, caliper, NMR, spectral noise, mud, core scans, seismic data, core image data, data that has been preprocessed with a quality control operation, etc.

Furthermore, the neural network model X (251) includes six hidden layers (i.e., hidden layer A (281), hidden layer B (282), hidden layer C (283), hidden layer D (284), hidden layer E (285), hidden layer F (286)), which may be a convolutional layer, a pooling layer, a rectified linear unit (ReLU) layer, a softmax layer, a regressor layer, a dropout layer, and/or various other hidden layer types. These hidden layers can be arranged in any order as long as they satisfy the input/output size criteria. Each layer comprises of a set number of image filters. The output of filters from each layer is stacked together in the third dimension. This filter response stack then serves as the input to the next layer(s).

In some embodiments, each hidden layer is a combination of a convolutional layer, a pooling layer, and a ReLU layer in a multilayer architecture. For example, each hidden layer (e.g., hidden layer A (281), hidden layer B (282), hidden layer C (283), hidden layer D (284), hidden layer E (285), hidden layer F (286)) has a convolutional layer, a pooling layer, and a ReLU layer. The hidden layer A (281) and the hidden layer B (282) may be down-sampling blocks to extract high-level features from the input data set. The hidden layer D (284) and the hidden layer E (285) may be up-sampling blocks to output the classified or predicted output data set. The hidden layer C (283) may perform residual stacking as bottleneck between down-sampling blocks (e.g., hidden layer A (281), hidden layer B (282)) and up-sampling blocks (e.g., hidden layer D (284), hidden layer E (285)). The hidden layer F (286) may include a softmax layer or a regressor layer to classify or predict a predetermined class or a value based on input attributes.

Furthermore, in a convolutional layer, the input data set is convolved with a set of learned filters, designed to highlight specific characteristics of the input data set. A pooling layer produces a scaled down version of the output. This is achieved by considering small neighborhood regions and applying the desired operation filter (e.g. min, max, mean, etc.) across the neighborhood. A ReLU layer enhances the nonlinear property of the network by introducing a non-saturating activation function. One example of such a function is to threshold out negative responses (set negative values to zero). A fully connected layer provides a high-level reasoning by connecting each node in the layer to all activation nodes in the previous layer. A softmax layer maps the inputs from the previous layer into a value between 0 and 1 which allows for interpreting the outputs as probabilities and selection of classified facie with highest probability. A dropout layer offers a regularization technique for reducing network over-fitting on the training data by dropping out individual nodes with a certain probability. A loss layer (utilized in training) defines the weight dependent cost function that needs to be optimized (bring cost down to zero) for improved accuracy.

Furthermore, the PCML algorithms (200) include an activation function in a ReLU layer (e.g., hidden layer F (286)) to calculate the sonic log prediction error (e.g., mean square error (MSE) or root mean squared error (RMSE)) between the predicted sonic logs and a ground truth (e.g., field sonic logs). For example, the activation function is a scaled version of the leaky rectified linear unit (LReLU) or a Swish activation function. The activation function is applied to the predicted Young's modulus and Poisson's ratio in such a way that the loss is negligible when the values of the predicted Young's modulus and Poisson's ratio are within the assumed physically meaningful range, and penalizes otherwise. In particular, the ground truth may include field sonic logs which are used to calibrate the predicted sonic logs during training to find the optimal model and model parameters. Thus, the model may be applied to predict sonic logs for a well of interest.

In some embodiments, a PCML algorithm (200) may use a simple data split technique to separate the input well logs (depth (205), GR (210), ZDEN (215), NPHI (220), and other data (225)) used for the training, validation, and testing of the PCML models. An example of the data split technique considers 70% of the obtained well logs for model training (e.g., tuning of the model parameters), 10% of the obtained well logs for validation (e.g., performance validation for each different set of model parameters), and 20% of the obtained well logs for testing the final trained model. However, the data split technique may result in the over-fitting problem of the PCML models with limited generalization capabilities. For example, the deployed model will underperform when predicting unseen samples. Although only example embodiments have been described in detail above, those skilled in the art will readily appreciate that many modifications are possible in the example embodiments without materially departing from this invention.

Furthermore, the PCML algorithms (200) apply a nested k-fold inner/outer cross-validation to tune and validate the optimal parameters of the ML model. In one or more embodiments, the nested stratified inner/outer cross-validation may be a software and hardware system which includes functionality to mitigate the over-fitting problem of the PCML model by applying a k-fold inner cross-validation and a k-fold outer cross-validation. The k-fold inner cross-validation and the k-fold outer cross-validation may have different values of the "k" parameter. In some example embodiments, the nested inner/outer cross-validation defines a plurality of PCML algorithms and their corresponding models in a grid and evaluates a performance metrics of interest (e.g., area under curve (AUC), accuracy, geometric mean, f1 score, mean absolute error, mean squared error, sensitivity, specificity, etc.) to find the optimal parameters of the PCML model.

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
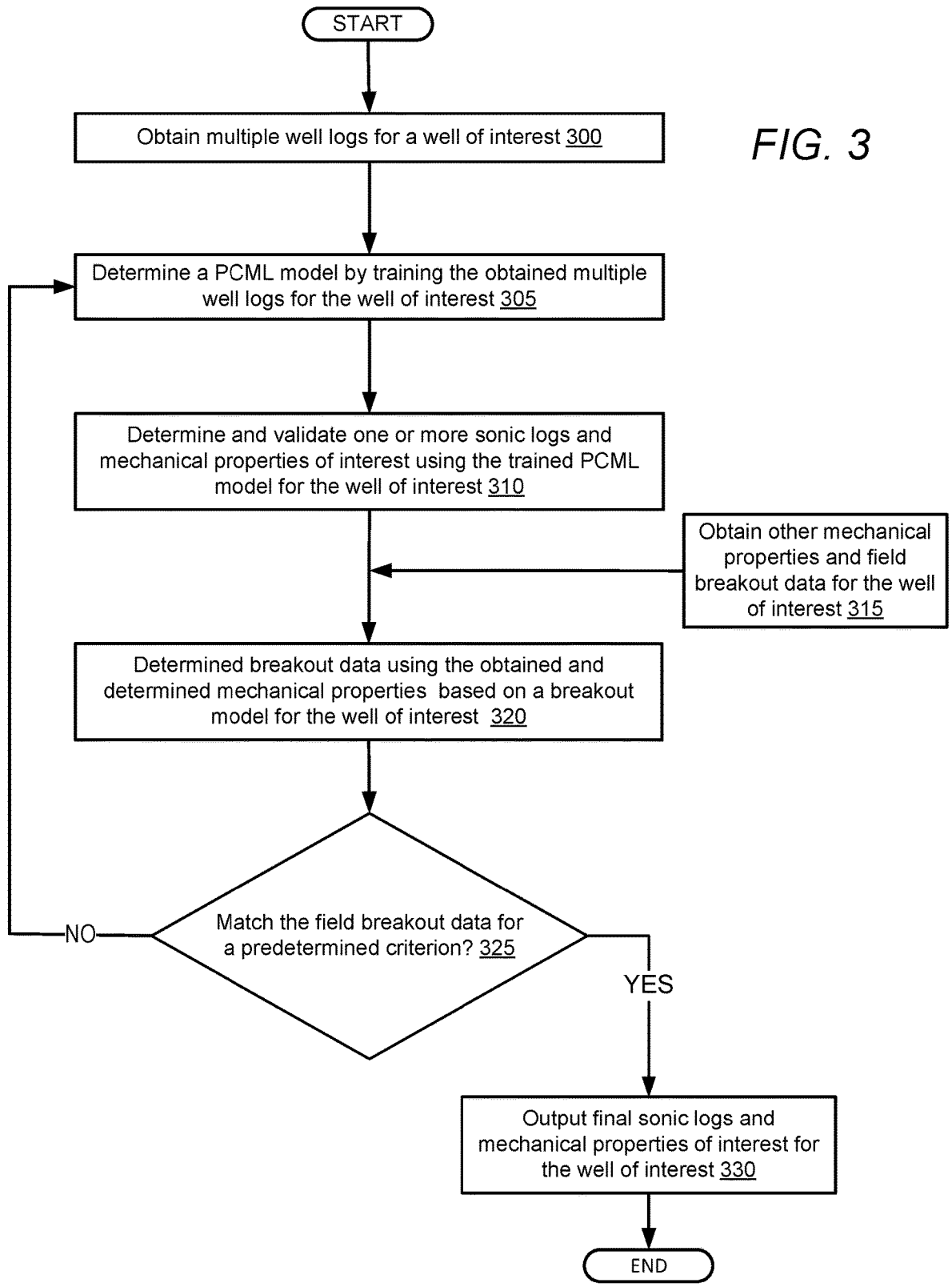
FIG. 3 shows a flowchart in accordance with one or more embodiments.

FIG. 3 shows a flowchart in accordance with one or more embodiments. Specifically, FIG. 3 describes a general workflow to correct and predict sonic logs and mechanical properties of interest using well logs and a breakout model. One or more blocks in FIG. 3 may be performed by one or more components (e.g., logging system (110), AI module (160), and control system (114)) as described in FIG. 1. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, multiple well logs are obtained for a well of interest in accordance with one or more embodiments. For example, the obtained well logs include gamma ray, neutron porosity, depth, caliper, spontaneous potential, neuron, shallow resistivity, medium resistivity, deep resistivity, photo-electric absorption factor, water saturation, porosity, and density. The obtained well logs may include diverse properties of the formation. The PCML model may improve prediction accuracy by including a large number of well logs of various types as input parameters. For example, repeat well logs may help to quantify uncertainty in predictions for the PCML model. The obtained well logs are pre-processed to be handle missing data, input anomalies detection and standardization of well logs. For example, the obtained well logs are filtered and resampled to remove systematic errors and invalid values due to environment conditions or incorrectly calibrated or malfunctioning logging tools.

In Block 305, a PCML model is determined by training the obtained multiple well logs in accordance with one or more embodiments. The PCML model is applied to predict one or more sonic logs and mechanical properties of interest (e.g., DTC, DTS, Young's modulus, Poisson's ratio). Different PCML algorithms (e.g., an artificial neural network, a linear regression algorithm, a logistic regression algorithm, a support vector regression algorithm, a random forest algorithm, a boosted decision tree algorithm, a multi-layer perceptron algorithm, a convolutional neural network, etc.) may be applied to perform the classification problem.

Furthermore, the learning objective function in the PCML algorithm incorporates a sonic log prediction error and a physics constraint directed loss (equation 1). Particularly, the sonic log prediction error is the mean squared error (MSE) or root mean squared error (RMSE) between the predicted sonic logs $f(x; \theta)$ and a ground truth y (e.g., field sonic logs). The physics constraint directed loss $g(x; \theta)$ is defined in terms of the validity of the mechanical properties of interest. The sonic log prediction error may have a vector norm of p (e.g., L1 or L2). The physics constraint direct loss error may have a vector norm of q (e.g., L1 or L2). For example, the L1 norm is calculated as the sum of the absolute values of the vector. The L2 norm is calculated as the square root of the sum of the squared vector values. A hyperparameter $\lambda$ is applied to the physics constraint direct loss error to balance the relative importance between sonic log prediction accuracy and the physics consistency.

$$L(\theta) = \|y - f(x;\theta)\|_p + \lambda \|g(f(x;\theta)\|_q \quad \text{Equation 1}$$

where $f(x; \theta)$ is the predicted sonic logs, y are input sonic log data, $g(f(x; \theta))$ is the activation output for the physics constraint; p and q are the vector norms; $\lambda$ is a hyperparameter to balance the relative importance between sonic log prediction accuracy and the physics consistency.

In Block 310, one or more sonic logs and mechanical properties of interest are determined using the trained PCML model for the well of interest in accordance with one or more embodiments. For example, the PCML model may be applied to predict DTC and DTS. As another example, the PCML model may be applied to predict Young's modulus and Poisson's ratio. Particularly, the PCML model may use physics-based correlations based on rock physics equations (equation 2 and 3) via an additional layer to calculate the mechanical properties of interest (e.g., Young's modulus and Poisson's ratio) using determined DTC and DTS.

$$R = DTS/DTC \quad \text{Equation 2}$$

$$v = (0.5 * R^2 - 1)/(R^2 - 1) \quad \text{Equation 3}$$

where DTS is shear sonic travel time, DTC is compressional sonic travel time, R is Young's modulus, v is Poisson's ratio.

Furthermore, the PCML model may calculate a learning objective function by applying an activation function in a hidden layer to the predicted Young's modulus and Poisson's ratio outputs. For example, the learning objective function is negligible when the values of the predicted Young's modulus and Poisson's ratio are within an appropriate physically meaningful range, and penalizes otherwise. As another example, a scaled version of the leaky rectified linear unit or the recent Swish activation function are both suitable for this purpose. This hidden layer may be a direct implementation of Poisson's ratio calculation (equation 3), or its surrogate via a network model (e.g., an Artificial Neural Network (ANN)). For example, the physics constraint direct loss function penalizes the predicted Poisson's ratio as $f((v-0.04)/(0.3-0.04))$ outside an appropriate range (e.g., a range from 0.04 to 0.3) defined by a user.

Furthermore, a PCML model validated with loss function defined above can be readily applied to independent new input log data to predict sonic logs that are consistent to the physics constraints. In addition, the PCML model may produce the physics constraint loss as an additional quality measure. As another example, a nested k-fold cross-validation technique is used to train and tune the PCML model parameters. For example, the inner k-fold cross-validation is used to tune the PCML model parameters performed on the obtained multiple well logs. The outer k-fold cross-validation is used to validate the final performance of the PCML model on the obtained multiple well logs.

In Block 315, other mechanical properties and field breakout data are obtained for the well of interest in accordance with one or more embodiments. For example, the other mechanical properties include gamma ray, neutron porosity, depth, caliper, spontaneous potential, neuron, shallow resistivity, medium resistivity, deep resistivity, photo-electric absorption factor, porosity, density, Young's modulus, Poisson's ratio, formation UCS, formation porosity, formation permeability, rock type, unconstrained sonic velocity, stiffness, SHmax, Shmin, pore pressure, cohesion, formation pore pressure, borehole fluid pressure, transgressive surface, and water saturation. The field breakout data include breakout angle, width, azimuth, and depth. The obtained mechanical properties and breakout data are pre-processed to handle missing data, input anomalies detection and standardization of well logs. For example, the obtained mechanical properties and breakout data are filtered and resampled to remove systematic errors and invalid values due to environment conditions or incorrectly calibrated or malfunctioning logging tools.

In Block 320, breakout data are determined using the obtained and determined mechanical properties based on a breakout model for the well of interest in accordance with one or more embodiments. Breakout data may include a breakout angle, width, azimuth, and depth. For example, the breakout angle $\theta$ of breakout initiation (e.g., half of breakout width) is calculated using formation UCS, pore pressure, SHmax, and Shmin based on a breakout model (equation 4). As another example, SHmax is defined by a user from previous experience or derived from other mechanical properties (e.g., Young's modulus, Poisson's ratio, etc.). Particularly, a breakout model shows a correlation between breakout and fracture orientations in the wellbore. A decrease of Young's modulus and an increase of Poisson's ratio suggest a weak zone at a depth of interest which may be the result of increasing microcrack density in the fracture core where the breakout (e.g., breakout angle, width, azimuth, and depth) develops.

$$S_{Hmax} = \frac{C_0 + \Delta P_W + 2P_p}{1 - 2\cos2\theta} - S_{hmin}\frac{1 + 2\cos2\theta}{1 - 2\cos2\theta} \qquad \text{Equation 4}$$

Where SHmax is the maximum horizontal compressive stress, Shmin is the least horizontal compressive stress. $C_0$ is formation UCS, $\Delta P_W$ is the absolute magnitude of the difference between formation pore pressure and borehole fluid pressure, Pp is the pore pressure, and θ is the breakout angle of breakout initiation.

In Block 325, a determination is made whether the determined breakout data match the field breakout data for a predetermined criterion in accordance with one or more embodiments. The predetermined criterion is used to calibrate and constrain the PCML model to predict correct sonic logs and mechanical properties by matching the breakout data generated using the predicted sonic logs and mechanical properties to field breakout data. The predetermined criterion for the breakout data may be a value defined by a user or a value derived from the field breakout data. For example, when the difference between a determined breakout angle and a field breakout angle is less than a predetermined value (e.g., a value of "10" degrees), the determined breakout angle matches the field breakout angle. As another example, when the difference between a determined breakout angle and a field breakout angle is less than a predetermined value (e.g., 100% of the standard deviation of field breakout angle), the determined breakout angle matches the field breakout angle. Where the determined breakout data has not matched the field breakout data to a predetermined criterion, the process may proceed to Block 305. Where the determined breakout data has matched the field breakout data to a predetermined criterion, the process may proceed to Block 330.

In Block 330, the final sonic logs and mechanical properties of interest for the well of interest are outputted in accordance with one or more embodiments. The final sonic logs may be applied to build accurate mechanic earth models to optimize mud weights during drilling.

Figure 4A:
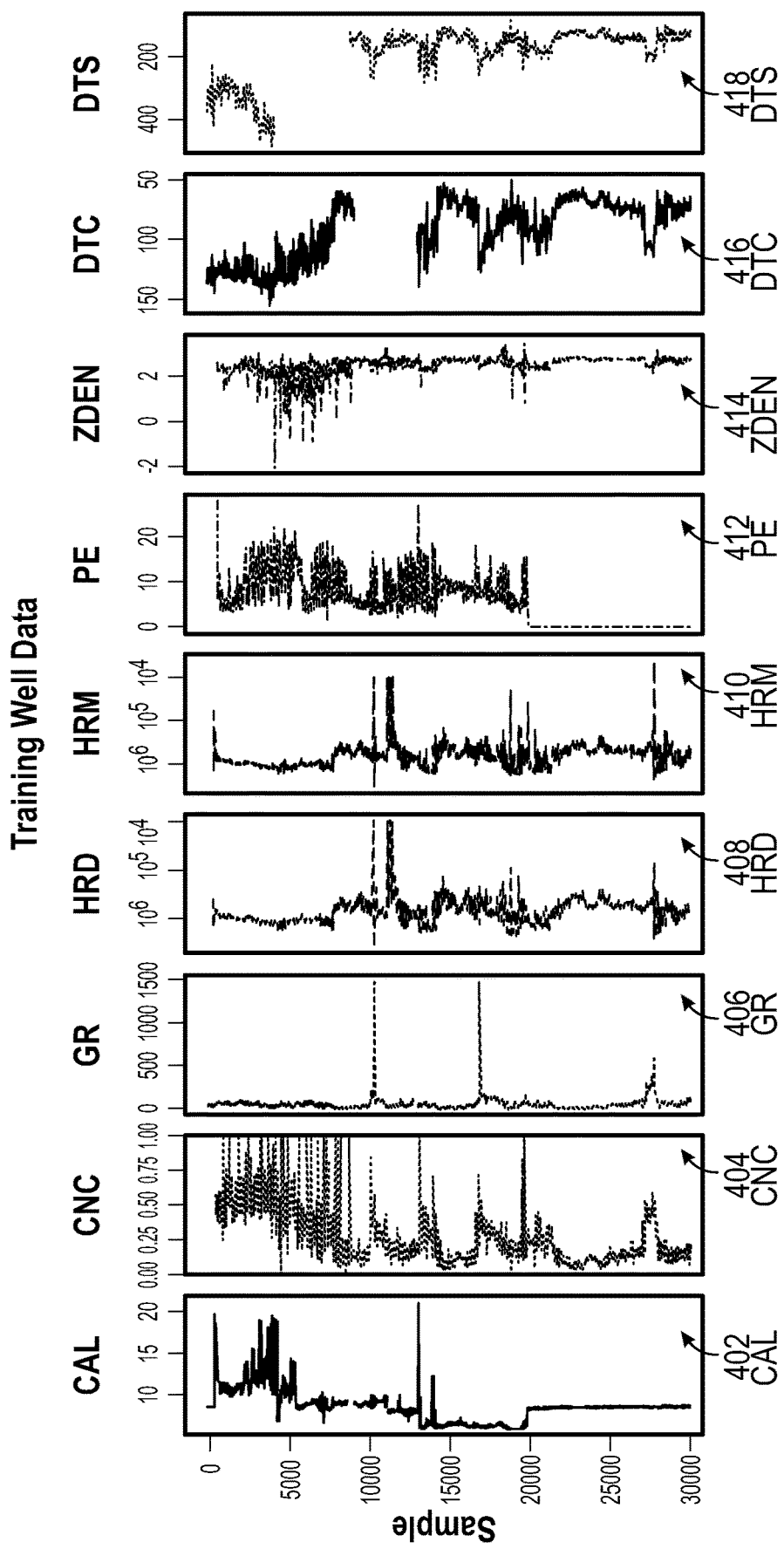
FIGS. 4A, 4B, and 4C show examples in accordance with one or more embodiments.
Figure 4B:
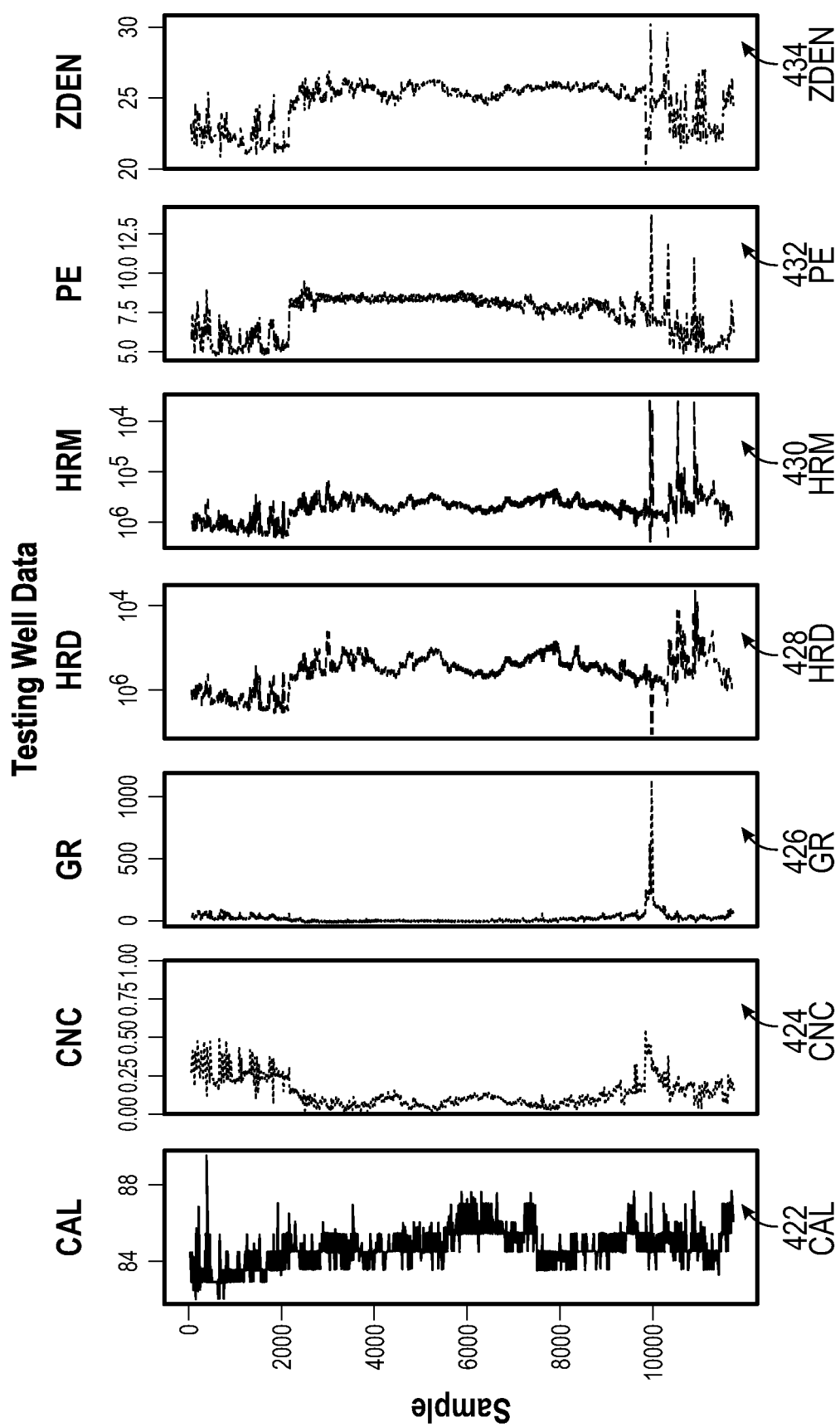
Figure 4C:
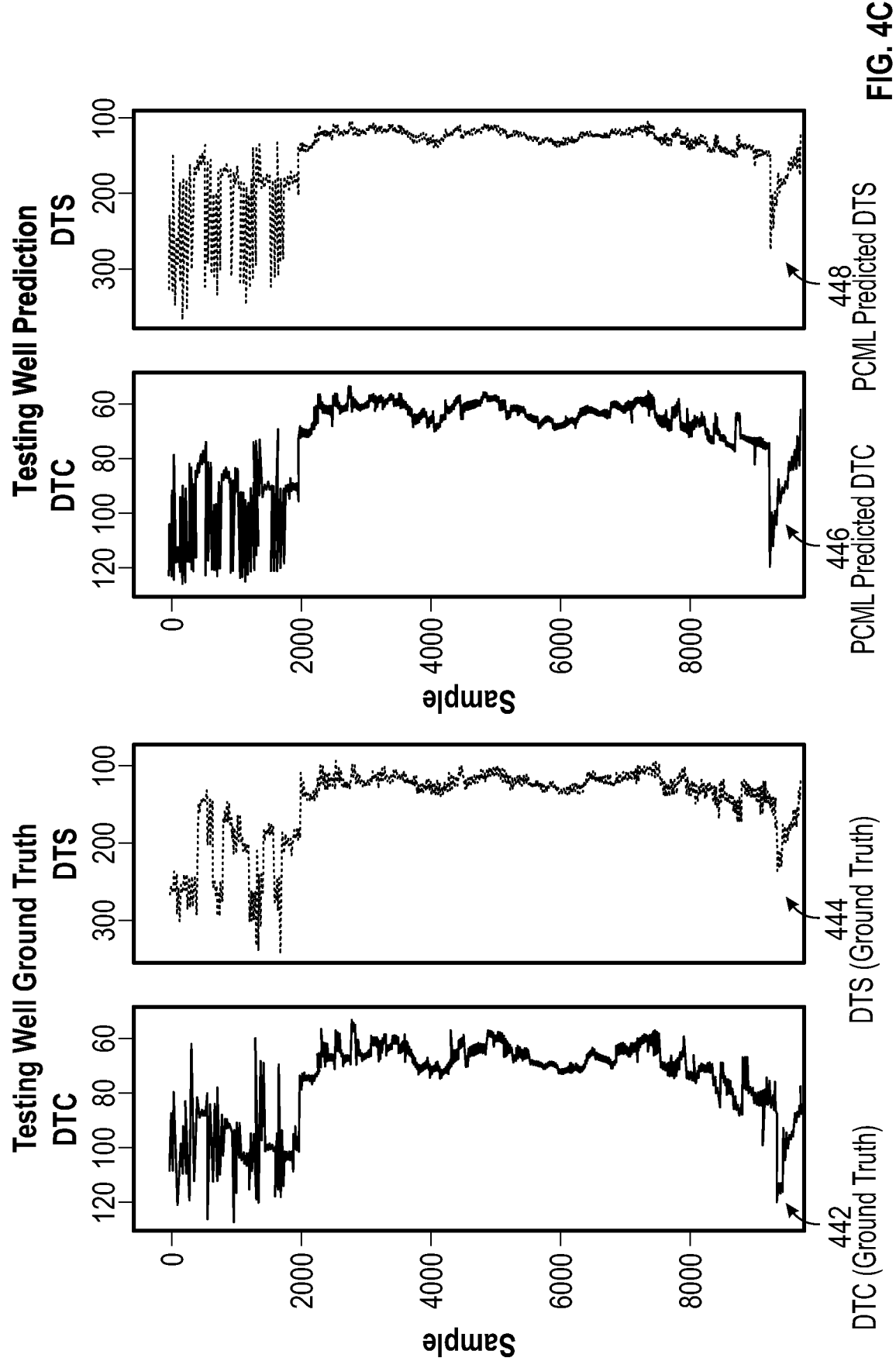

Turning to FIGS. 4A, 4B, and 4C, the AI module applies a PCML algorithm to correct and predict sonic logs and mechanical properties of interest for a well of interest. In this example, the PCML algorithm trains a model using seven well logs as input parameters for a well of interest. FIG. 4A shows an example of training well logs (e.g., CAL (402), CNC (404), GR (406), HRD (408), HRM (410), PE (412), and ZDEN (414)) and ground truth sonic logs (e.g., DTC (416) and DTS (418)). The ground truth sonic logs (e.g., DTC (416) and DTS (418)) have missing data due to bad borehole conditions. FIG. 4B shows an example of testing well logs (e.g., CAL (422), CNC (424), GR (426), HRD (428), HRM (430), PE (432), and ZDEN (434)). The AI module applies the PCML model to the testing well logs to correct and predict sonic logs (e.g., DTC (446) and DTS (448)). FIG. 4C shows the predicted sonic logs (e.g., DTC (446) and DTS (448)) based on the PCML model match the ground truth DTC (442) and DTS (444).

Figure 5:
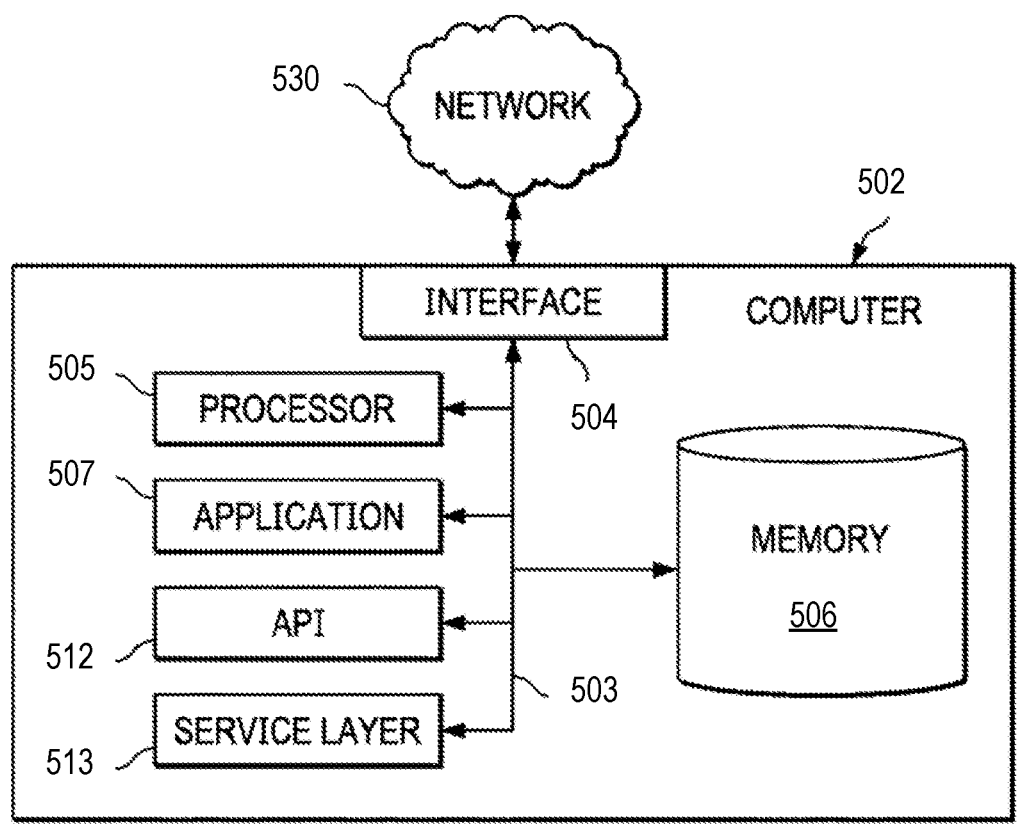
FIG. 5 shows a computer system in accordance with one or more embodiments.

Embodiments disclosed herein may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer.

Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504) includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505) that executes the AI module (160) described above. Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

Furthermore, memory (506) can be a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory (506) may be called a register, a cache, a main memory (main storage apparatus), or the like. Memory (506) can save a program (program code), a software module, and the like that can be executed to carry out the radio communication method according to an embodiment of the present invention.

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), wherein each computer (502) communicates over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A computer-implemented method, comprising:
    collecting well logs data with a logging system comprising at least one of a geomechanical probe, a Nuclear Magnetic Resonance (NMR) spectrometer, a resistivity logging tool, an acoustic transducer, and an acoustic borehole televiewer that measure petrophysical properties pertaining to a well of interest;
    obtaining, by a computer processor, the well logs data pertaining to the well of interest;
    training, by the computer processor, a physics-constrained machine learning (PCML) model using the obtained well logs data as inputs;
    outputting, by the computer processor, a plurality of sonic logs and mechanical properties of interest determined by using the trained PCML model and the obtained well logs data for the well of interest;

updating, by the computer processor, the plurality of determined sonic logs and the mechanical properties of interest based on a breakout model and field breakout data for the well of interest;

outputting, by the computer processor, a plurality of final sonic logs for the well of interest; and determining, by the computer processor, a plurality of final mechanical properties for well planning based on the plurality of final sonic logs for the well of interest.

2. The computer-implemented method of claim 1, wherein the plurality of final sonic logs completes a missing section or entire log depth for the well of interest; and wherein the plurality of final sonic logs are determined for sonic logs with missing data for the well of interest.

3. The computer-implemented method of claim 1, wherein the plurality of final mechanical properties are determined to build a mechanical earth model used for a well to drill.

4. The computer-implemented method of claim 1: wherein the PCML model comprises at least one of: a clustering algorithm, an extreme-gradient boost (XGBoost) algorithm, a long short-term memory (LSTM) algorithm, a random forest algorithm, a boosted decision tree algorithm, a multi-layer perceptron algorithm, a support vector machine algorithm, an inductive learning algorithm, a deductive learning algorithm, a supervised learning algorithm, an artificial neural network, a convolutional neural network, an unsupervised machine learning algorithm, a weakly supervised machine learning algorithm, a deep neural network, and a recurrent neural network.

5. The computer-implemented method of claim 4: wherein the PCML model uses a learning objective function which includes a sonic log prediction error and a physics constraint directed loss.

6. The computer-implemented method of claim 5: wherein the sonic log prediction error of the learning objective function comprises a mean square error (MSE) or a root mean squared error (RMSE) between predicted sonic logs and a ground truth for the well of interest, wherein the physics constraint directed loss of the learning objective function is defined in terms of a validity of the mechanical properties of interest, and wherein the physics constraint directed loss of the learning objective function is scaled by a hyperparameter to balance a relative importance between the sonic log prediction error and the physics constraint directed loss.

7. The computer-implemented method of claim 5: wherein the PCML model comprises a leaky rectified linear unit or a Swish activation function to calculate the learning objective function based on predicted sonic logs and the mechanical properties for the well of interest, wherein the PCML model penalizes the learning objective function based on the predicted sonic logs and the mechanical properties of interest outside a predetermined physically meaningful range for the well of interest, and wherein the PCML model determines a negligible value for the learning objective function based on the predicted sonic logs and the mechanical properties of interest within the predetermined physically meaningful range for the well of interest.

8. The computer-implemented method of claim 5, wherein the PCML model comprises a direct implementation based on rock physics equations to generate the physics constraint directed loss using predicted sonic logs as input parameters, and wherein the PCML model uses a neural network to generate the physics constraint directed loss based on a surrogate of the mechanical properties of interest.

9. The computer-implemented method of claim 1, wherein the field breakout data comprises breakout angle, width, azimuth, and depth.

10. The computer-implemented method of claim 1, wherein the plurality of sonic logs and the mechanical properties of interest determined by using the trained PCML model are used to calculate breakout data based on the breakout model to match the field breakout data.

11. A system, comprising:
a logging system coupled to a logging tool, the logging system comprising at least one of a geomechanical probe, a Nuclear Magnetic Resonance (NMR) spectrometer, a resistivity logging tool, an acoustic transducer, and an acoustic borehole televiewer that measure petrophysical properties pertaining to a well of interest;
a well system coupled to the logging system and a wellbore; and
an artificial intelligence module comprising a computer processor, wherein the artificial intelligence module is coupled to the logging system and the well system, the artificial intelligence module comprising functionality for:
obtaining well logs data pertaining to the well of interest;
training a physics-constrained machine learning (PCML) model using the obtained well logs data as inputs;
outputting a plurality of sonic logs and mechanical properties of interest determined by using the trained PCML model and the obtained well logs data for the well of interest;
updating the plurality of sonic logs and the mechanical properties of interest based on a breakout model and field breakout data for the well of interest;
outputting a plurality of final sonic logs for the well of interest; and
determining a plurality of final mechanical properties for well planning based on the plurality of final sonic logs for the well of interest.

12. The system of claim 11: wherein the PCML model comprises at least one of: a clustering algorithm, an XGBoost algorithm, a Long Short-Term Memory (LSTM) algorithm, a random forest algorithm, a boosted decision tree algorithm, a multi-layer perceptron algorithm, a support vector machine algorithm, an inductive learning algorithm, a deductive learning algorithm, a supervised learning algorithm, an artificial neural network and a convolutional neural network, an unsupervised machine learning algorithm, a weakly supervised machine learning algorithm, a deep neural network, and a recurrent neural network.

13. The system of claim 12: wherein the PCML model uses a learning objective function which includes a sonic log prediction error and a physics constraint directed loss.

14. The system of claim 13: wherein the sonic log prediction error of the learning objective function comprises a mean square error (MSE) or a root mean squared error (RMSE) between predicted sonic logs and a ground truth for the well of interest, wherein the physics constraint directed loss of the learning objective function is defined in terms of a validity of the mechanical properties of interest, and wherein the physics constraint directed loss of the learning objective function is scaled by a hyperparameter to balance a relative importance between the sonic log prediction error and the physics constraint directed loss.

15. The system of claim 13:

wherein the PCML model comprises a leaky rectified linear unit or a Swish activation function to calculate the learning objective function based on predicted sonic logs and the mechanical properties for the well of interest, wherein the PCML model penalizes the learning objective function based on the predicted sonic logs and the mechanical properties of interest outside a predetermined physically meaningful range for the well of interest, and wherein the PCML model determines a negligible value for the learning objective function based on the predicted sonic logs and the mechanical properties of interest within the predetermined physically meaningful range for the well of interest.

16. The system of claim 13, wherein the PCML model comprises a direct implementation based on rock physics equations to generate the physics constraint directed loss using predicted sonic logs as input parameters, and wherein the PCML model uses a neural network to generate the physics constraint directed loss based on a surrogate of the mechanical properties of interest.

17. The system of claim 11, wherein the field breakout data comprises breakout angle, width, azimuth, and depth.

18. The system of claim 11, wherein the plurality of sonic logs and the mechanical properties of interest determined by using the PCML model are used to calculate breakout data based on the breakout model to match the field breakout data.

19. A non-transitory computer readable medium storing instructions executable by a computer processor, the instructions comprising functionality for:

obtaining well logs data pertaining to a well of interest;

training a physics-constrained machine learning (PCML) model using the obtained well logs data as inputs;

outputting a plurality of sonic logs and mechanical properties of interest determined by using the trained PCML model and the obtained well logs data for the well of interest;

updating the plurality of sonic logs and the mechanical properties of interest based on a breakout model and field breakout data for the well of interest;

outputting a plurality of final sonic logs for the well of interest; and determining a plurality of final mechanical properties for well planning based on the plurality of final sonic logs for the well of interest, wherein the well logs data is collected with a logging system comprising at least one of a geomechanical probe, a Nuclear Magnetic Resonance (NMR) spectrometer, a resistivity logging tool, an acoustic transducer, and an acoustic borehole televiewer that measure petrophysical properties pertaining to the well of interest.

20. The non-transitory computer readable medium of claim 19, wherein the PCML model uses a learning objective function which includes a sonic log prediction error and a physics constraint directed loss, wherein the sonic log prediction error of the learning objective function comprises a mean square error (MSE) or a root mean squared error (RMSE) between predicted sonic logs and a ground truth for the well of interest, wherein the physics constraint directed loss of the learning objective function is defined in terms of a validity of the mechanical properties of interest, and wherein the physics constraint directed loss of the learning objective function is scaled by a hyperparameter to balance a relative importance between the sonic log prediction error and the physics constraint directed loss.

* * * * *